(12) United States Patent
Watanabe et al.

(10) Patent No.: US 11,218,600 B2
(45) Date of Patent: Jan. 4, 2022

(54) IMAGE FORMING APPARATUS AND NON-TRANSITORY COMPUTER READABLE MEDIUM STORING PROGRAM

(71) Applicant: FUJIFILM Business Innovation Corp., Tokyo (JP)

(72) Inventors: Hiroyuki Watanabe, Kanagawa (JP); Takeyasu Koyanagi, Kanagawa (JP); Yuki Iguchi, Kanagawa (JP); Koji Sakuma, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/737,919

(22) Filed: Jan. 9, 2020

(65) Prior Publication Data
US 2021/0029256 A1    Jan. 28, 2021

(30) Foreign Application Priority Data
Jul. 26, 2019  (JP) .............................. JP2019-137835

(51) Int. Cl.
*H04N 1/00* (2006.01)
*G06K 15/02* (2006.01)
*G06F 3/12* (2006.01)

(52) U.S. Cl.
CPC ....... *H04N 1/00087* (2013.01); *H04N 1/0005* (2013.01); *H04N 1/00015* (2013.01); *H04N 1/00037* (2013.01); *H04N 1/00076* (2013.01)

(58) Field of Classification Search
None
See application file for complete search history.

(56) References Cited

U.S. PATENT DOCUMENTS

| | | | |
|---|---|---|---|
| 7,469,991 B2 | 12/2008 | Suzuki et al. | |
| 2005/0180764 A1* | 8/2005 | Koike | G03G 21/1882 399/12 |
| 2005/0213166 A1* | 9/2005 | Tsuboi | H04N 1/00389 358/474 |
| 2008/0088891 A1* | 4/2008 | Shiraishi | H04N 1/40006 358/504 |
| 2009/0129802 A1* | 5/2009 | Yasukawa | G03G 15/5012 399/53 |
| 2009/0231603 A1* | 9/2009 | Takemoto | H04N 1/00209 358/1.9 |
| 2009/0237730 A1* | 9/2009 | Tokunaga | G06F 3/1229 358/1.15 |
| 2010/0021188 A1* | 1/2010 | Kai | G03G 15/50 399/31 |

(Continued)

FOREIGN PATENT DOCUMENTS

| JP | 2006020026 | * 1/2006 | ............... H04N 1/00 |
|---|---|---|---|
| JP | 2006292824 | 10/2006 | |

(Continued)

*Primary Examiner* — Beniyam Menberu
(74) *Attorney, Agent, or Firm* — JCIPRNET

(57) ABSTRACT

An image forming apparatus includes a printing unit that prints an image on a recording medium, and an image quality adjustment unit that performs an image quality adjustment of the printing unit in a case of a state in which an operation is started, which causes the number of operations performed by a user to become larger than a predetermined number.

17 Claims, 11 Drawing Sheets

(56) References Cited

U.S. PATENT DOCUMENTS

| | | | | |
|---|---|---|---|---|
| 2010/0277764 A1* | 11/2010 | Yamazaki | ......... | G03G 15/5066 |
| | | | | 358/1.15 |
| 2012/0243054 A1* | 9/2012 | Sellers | ............... | H04N 1/00954 |
| | | | | 358/448 |
| 2015/0365542 A1* | 12/2015 | Kim | ................... | H04N 1/00973 |
| | | | | 358/1.14 |
| 2016/0284385 A1* | 9/2016 | Nomura | ................ | G06F 1/3287 |

FOREIGN PATENT DOCUMENTS

| | | | | |
|---|---|---|---|---|
| JP | 2007096614 | | 4/2007 | |
| JP | 2009104006 | * | 5/2009 | ............ G03G 21/14 |
| JP | 2011110822 | | 6/2011 | |
| JP | 2015130603 | | 7/2015 | |

* cited by examiner

FIG. 5

| IMAGE QUALITY ADJUSTMENT ITEM | NUMBER OF SHEET TO BE PRINTED | REQUIRED TIME |
|---|---|---|
| TONER REPLENISHMENT | 30 SHEETS OR 40 SHEETS | 10 SECONDS |
| POSITION SHIFT CORRECTION | 300 SHEETS | 30 SECONDS |
| GRAYSCALE CORRECTION | 400 SHEETS | 50 SECONDS |
| ... | ... | ... |

FIG. 6

| OPERATION ID | OPERATION CONTENT | NUMBER OF OPERATIONS | OPERATION TIME |
|---|---|---|---|
| 1 | INPUT ADDRESS OF FACSIMILE | 11 | 60 SECONDS |
| 2 | DETAILED SETTING FOR FACSIMILE | 3 | 15 SECONDS |
| 3 | DETAILED SETTING OPERATION FOR PRINTING | 3 | 15 SECONDS |
| 4 | DETAILED SETTING FOR READING | 3 | 15 SECONDS |
| ⋮ | ⋮ | ⋮ | ⋮ |

IMAGE FORMING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-137835 filed Jul. 26, 2019.

BACKGROUND

(i) Technical Field

The present invention relates to an image forming apparatus and a non-transitory computer readable medium storing a program.

(ii) Related Art

JP2007-096614A discloses an image forming apparatus, which includes an automatic adjustment performance unit for performing automatic adjustment, the image forming apparatus including a job discrimination unit that discriminates between an engine job which uses a printer engine and a non-engine job which does not use the printer engine, a trigger generation unit that generates a non-engine job transition trigger in a case where it is discriminated to the non-engine job, and an automatic adjustment transition unit that transitions to the automatic adjustment according to reaching of the printer engine to an automatic adjustment transition condition while the engine job is performed. In a case where the non-engine job transition trigger is generated, the automatic adjustment performance unit antecedently performs the automatic adjustment according to reaching of the printer engine to a condition shifted by a prescribed width from the automatic adjustment transition condition.

JP2006-292824A discloses an image forming apparatus, which properly performs a prescribed image correction operation while an image forming operation is performed in order to form an image having a further fixed quality in an electrophotographic process, the image forming apparatus including a counting unit that counts the number of accumulated printed recording sheets, and an image correction control unit that performs the image correction operation in a case where the counted number of accumulated recording sheets reaches a regulated number. The image correction control unit properly advances a performance period of the image correction operation according to a prescribed operation situation of the image forming apparatus.

JP2015-130603A discloses an image forming apparatus, which receives and performs a plurality of jobs, the image forming apparatus including a determination unit that determines whether or not a calibration requiring job, which requires calibration for image formation, exists in the plurality of jobs in a case where the plurality of jobs are received, a changing unit that changes a performance order of a non-calibration requiring job other than the calibration requiring job to an earlier order in a case where the calibration requiring job exists as a result of the determination, and a performance unit that starts the performance of the calibration and performance of the plurality of jobs, the performance orders of which are changed, in parallel.

JP2011-110822A discloses a printing apparatus including a reading unit that performs reading of an image recorded on a document, a printing unit that performs printing of the image read by the reading unit with respect to a recorded medium, a correction unit that performs correction for image adjustment in a case where the printing unit performs the printing, a detection unit that detects a fact that the reading performed by the reading unit is suspended, and a control unit that causes the correction unit to perform the correction in a case where the detection unit detects the suspension of the reading.

SUMMARY

Aspects of non-limiting embodiments of the present disclosure relate to an image forming apparatus and a non-transitory computer readable medium storing a program that are capable of reducing waiting time of a user, compared to a case where an adjustment operation is uniformly performed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: a printing unit that prints an image on a recording medium; and an image quality adjustment unit that performs an image quality adjustment of the printing unit in a case of an operation in which the number of user operations is greater than a predetermined number is started.

BRIEF DESCRIPTION OF THE DRAWINGS

Exemplary embodiment(s) of the present invention will be described in detail based on the following figures, wherein:

FIG. 5 is a table illustrating a list of image quality adjustment items in the image forming apparatus according to the exemplary embodiment of the present invention;

FIG. 6 is a table illustrating a list of operation content in the image forming apparatus according to the exemplary embodiment of the present invention;

DETAILED DESCRIPTION

Figure 1:
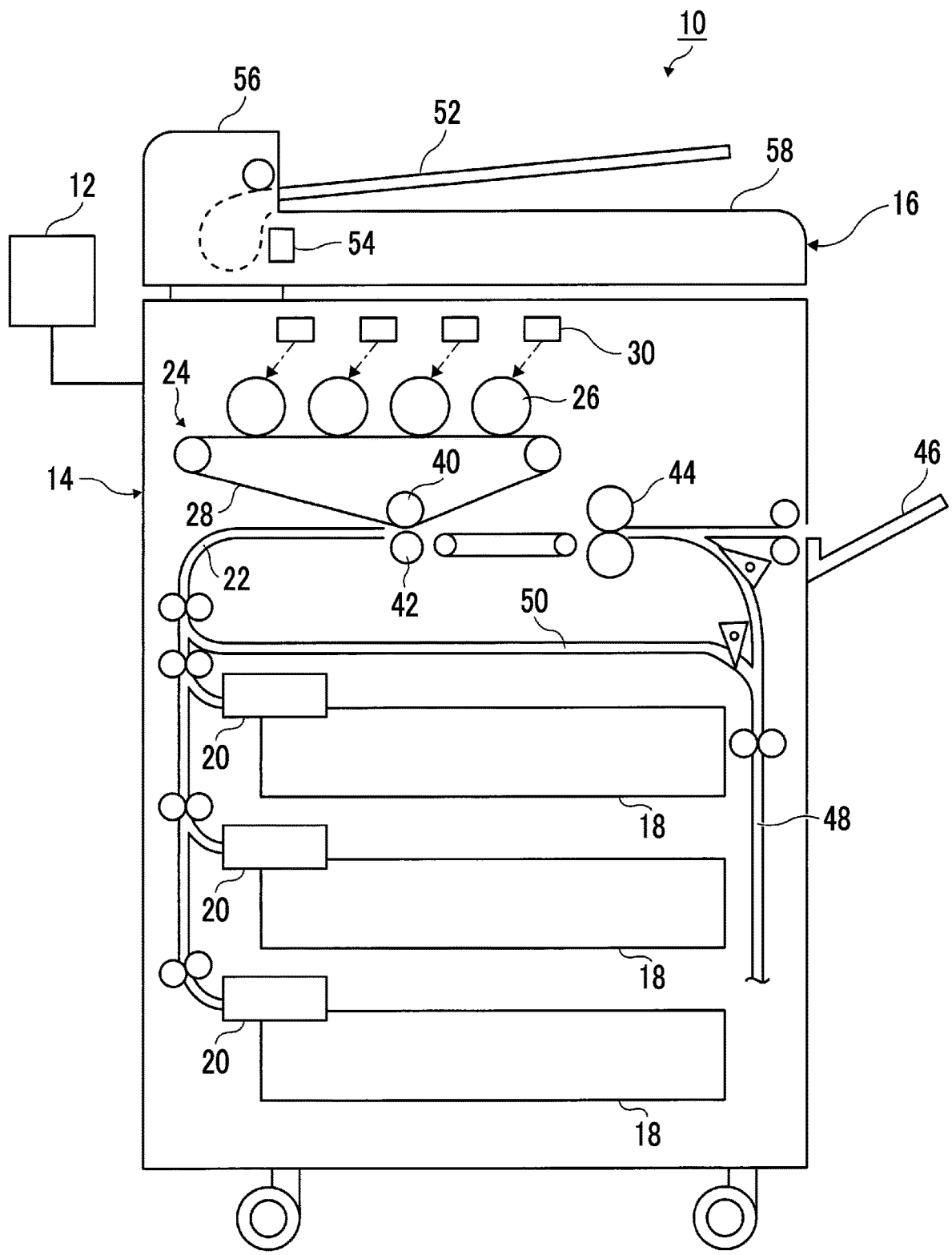
FIG. 1 is a side view illustrating an image forming apparatus according to an exemplary embodiment of the present invention.

An image forming apparatus 10 includes an input operation device 12, a printing unit 14, and an image reading unit 16.

The input operation device 12 is a device which is configured to include a display device that displays information, and an input reception device that receives an input performed by a user, and is formed by, for example, a touch panel and a liquid crystal display. The user is capable of inputting operation setting information through the input operation device 12. The input operation device 12 may be configured to be separated from the image forming apparatus 10 or may be configured to be integrated with the image forming apparatus 10.

The printing unit 14 includes, for example, recording medium supply units 18 in three stages, and supply heads 20 are provided to the respective recording medium supply units 18.

Meanwhile, the recording medium supply units 18 are provided with recording medium existence/non-existence sensors (not illustrated in the drawing) which detect existence/non-existence of a recording medium.

In a case where one of the recording medium supply units 18 is selected, the supply head 20 operates, thereby supplying the recording medium from the selected recording medium supply unit 18 to a printing main body unit 24 through a recording medium conveyance path 22.

The printing main body unit 24 is established with yellow, magenta, cyan, and black photoreceptors 26, respectively, and is provided with an intermediate transfer belt 28.

Figure 2:
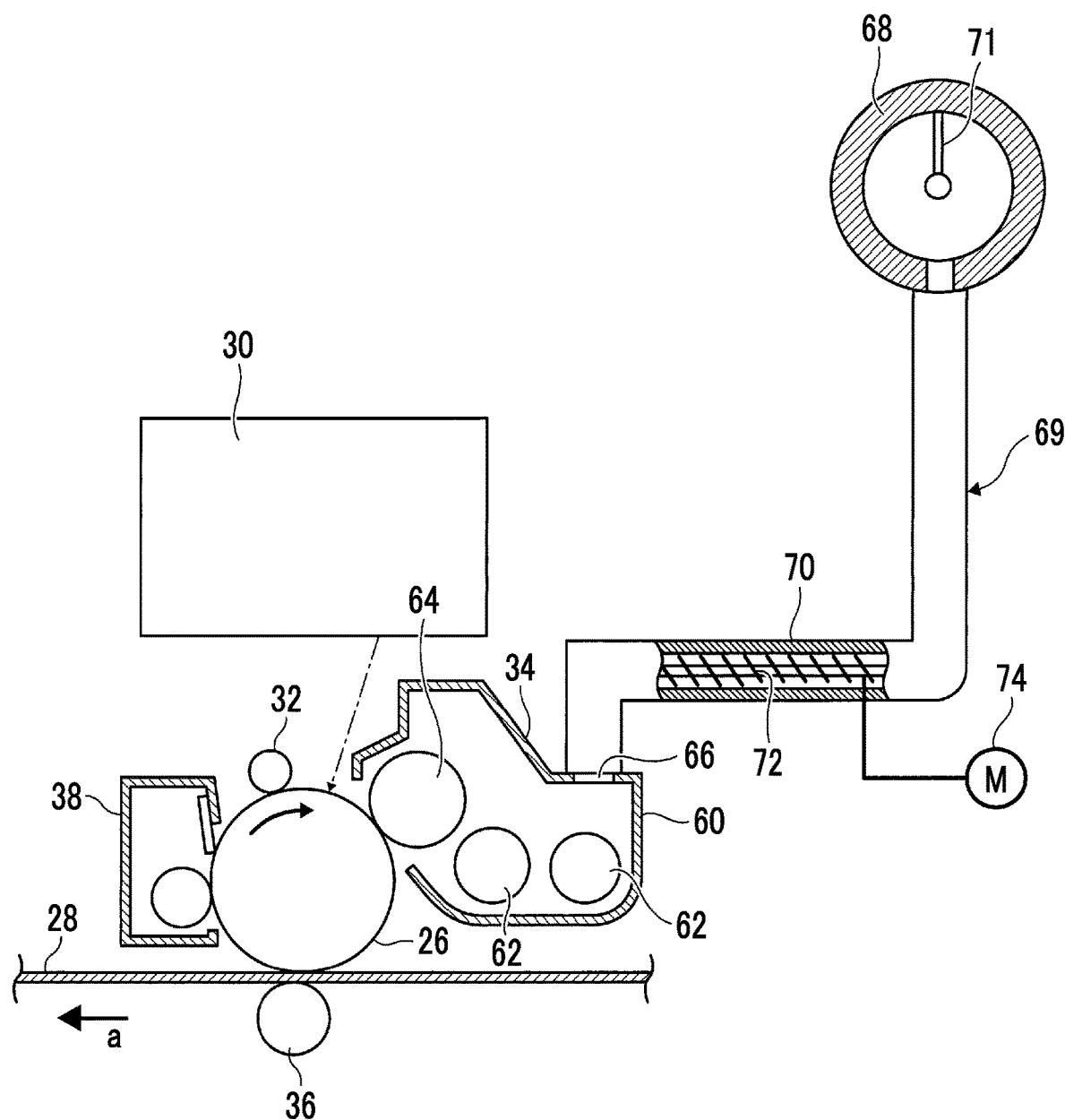
FIG. 2 is a side view illustrating a partial cross section of an image forming unit in the image forming apparatus according to the exemplary embodiment of the present invention.

As illustrated in FIG. 2, in a vicinity of each of the photoreceptors 26, a charging device 32, a development device 34, a primary transfer device 36, and a cleaning device 38 are disposed, in addition to an exposure device 30. The photoreceptor 26 is charged by the charging device 32, and a latent image is formed by the exposure device 30, is developed by the development device 34, is transferred to the intermediate transfer belt 28 by the primary transfer device 36, and is cleaned by the cleaning device 38.

The recording medium is sent between a back-up roller 40 and a secondary transfer roller 42, and a toner image of the intermediate transfer belt 28 is transferred. That is, a voltage whose polarity is opposite to the toner is applied between the back-up roller 40 and the secondary transfer roller 42, and thus the toner image of the intermediate transfer belt 28 is transferred. The recording medium, to which the toner image is transferred, is sent to a fixing device 44, and the toner image is fixed to the recording medium by the fixing device 44. The recording medium, to which the toner image is fixed, is discharged to a recording medium discharging unit 46 through the recording medium conveyance path 22.

The recording medium discharging unit 46 is provided with a discharged recording medium sensor (not illustrated in the drawing) which detects whether or not the discharged readable medium reaches an upper limit.

In a case where double-sided printing is set, the recording medium, whose surface is fixed by the fixing device 44, is sent from the recording medium conveyance path 22 to a reversing device 48, is reversed in the reversing device 48, is sent to a recording medium reversing path 50, is returned to the recording medium conveyance path 22 again, is sent to the printing main body unit 24, and thus a back surface is printed.

The image reading unit 16 is configured to include a document supply unit 52 to which a document is supplied, an image reading sensor 54 which is formed by a CCD or the like, a document sending device 56 which sends the document from the document supply unit 52 to the image reading sensor 54, and a document discharging unit 58 which discharges the document whose image is read by the document image reading sensor 54.

In addition, as illustrated in FIG. 2, the development device 34 includes a development device main body 60, and stirring and conveying members 62 and 62 are provided in the development device main body 60. In addition, a development roller 64 is provided to face the photoreceptor 26 in the development device main body 60. Developer, which includes the toner and a carrier accommodated in the development device main body 60, is stirred and conveyed by the stirring and conveying members 62 and 62, and thus the toner is charged and the charged toner is supplied from the development roller 64 to the photoreceptor 26.

In addition, an opening unit 66 is formed in the development device main body 60. The opening unit 66 is formed to receive the toner which is conveyed from a toner storing container 68 by the toner conveyance device 64.

A toner conveyance device 69 includes a toner conveyance path forming member 70, and a toner conveyance member 72 disposed in the toner conveyance path forming member 70. The conveyance path forming member 70 includes, for example, a tube, and is used as a toner conveyance path for conveying the toner. The toner conveyance member 72 is configured to include, for example, a spiral blade member, is rotated in a case where drive from a motor 74, which is used as a driving source, is transmitted, and conveys the toner toward the development device 34 through rotation. In addition, the toner storing container 68 is provided with a toner supply unit 71, and supplies the toner to the toner conveyance device 69 in a case where the toner supply unit 71 is rotated.

Figure 3:
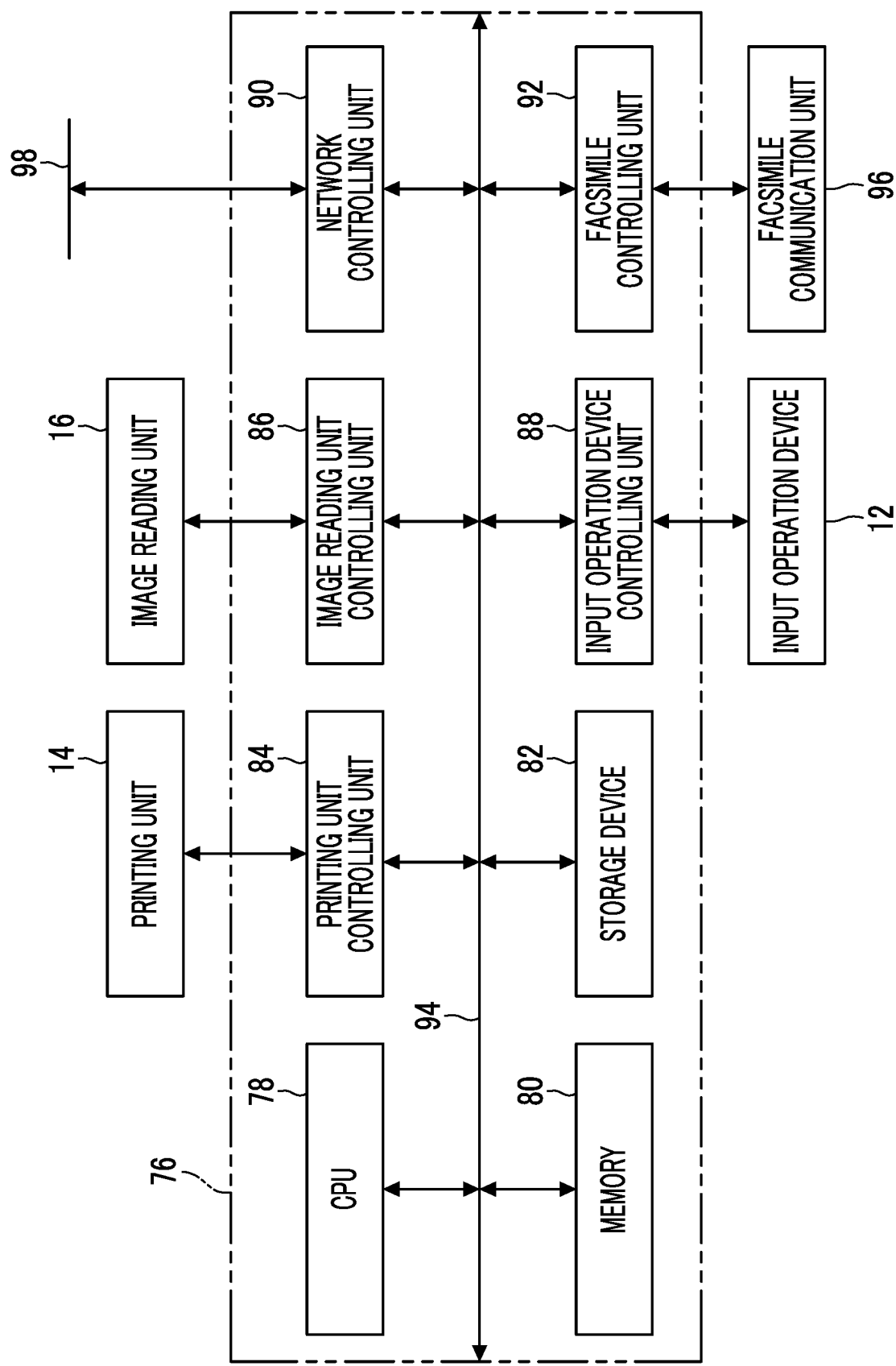
FIG. 3 is a block diagram illustrating a hardware configuration of a control device used for the image forming apparatus according to the exemplary embodiment of the present invention.

FIG. 3 illustrates a hardware configuration of the control device 76 in the image forming apparatus 10.

In the control device 76, a CPU (an abbreviation of a Central Processing Unit) 78, a memory 80, a storage device 82, a printing unit controlling unit 84, an image reading unit controlling unit 86, an input operation device controlling unit 88, a network controlling unit 90, and a facsimile controlling unit 92 are connected through a control bus 94.

The CPU 78 performs a predetermined process based on a control program stored in the memory 80. The storage device 82 is configured to include, for example, a hard disk or the like, and stores software and data. The printing unit controlling unit 84 controls the printing unit 14. The image reading unit controlling unit 86 controls the image reading unit 16. The input operation device controlling unit 88 controls the input operation device 12. The facsimile controlling unit 92 controls a facsimile communication unit 96. The facsimile controlling unit 92 transmits the image, which is read in the image reading unit 16 according to setting input from the input operation device 12, to another facsimile through the facsimile communication unit 96, or forms an image in the image forming unit according to an image signal which is transmitted through the facsimile communication unit 96. Here, a method is used in which the facsimile controlling unit 92 reads the image using the image reading unit 16 after communication with an address, to which the image is sent, is established. The network controlling unit 90 is connected to a wired or wireless network 98, and controls communication with the network 98.

Subsequently, a flow of a process performed by the CPU 78 and the printing unit controlling unit 84 will be described.

Figure 4:
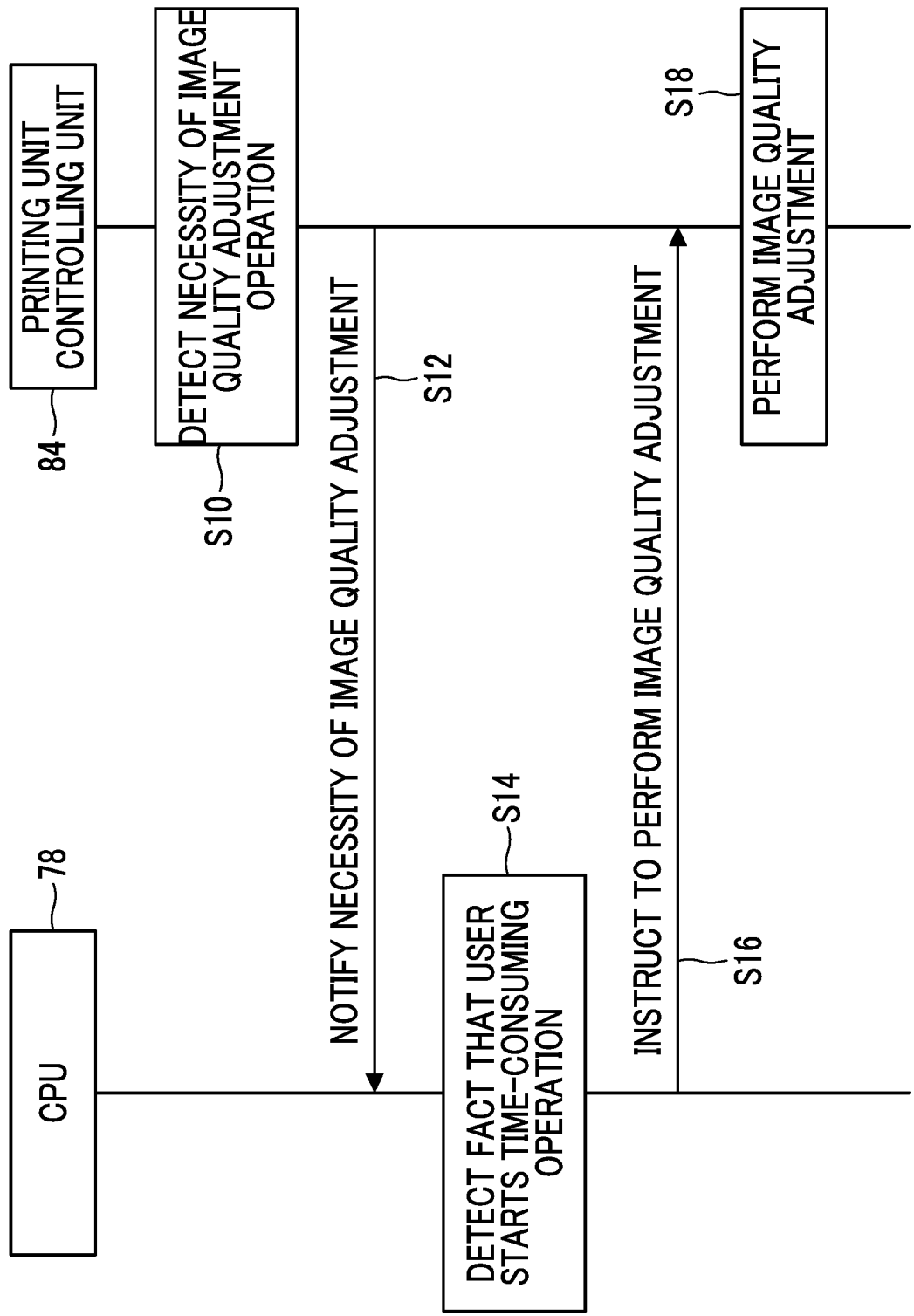
FIG. 4 is a sequence diagram illustrating a first example of a flow of a process performed between a CPU and an image forming unit controlling unit in the image forming apparatus according to the exemplary embodiment of the present invention.

FIG. 4 is a sequence diagram illustrating a first example of a sequence performed by the CPU 78 and the print control unit 84.

First, in step S10, the printing unit controlling unit 84 detects necessity of an image quality adjustment. The image quality adjustment is a process of adjusting an image quality in a case where there is a problem in that the image quality to be printed on the recording medium by the printing unit 14 is varied. In addition, the necessity of the image quality adjustment indicates a state in which there is a problem in that the image quality is varied. The necessity of the image quality adjustment is determined based on, for example, a counted value of the number of sheets to be printed.

The necessity of the image quality adjustment differs depending on a type of the image quality adjustment. FIG. 5 illustrates the type of the image quality adjustment. The image quality adjustment includes color correction, color shift correction, and the like in addition to toner replenishment, position shift correction, grayscale correction, and the like. The toner replenishment is performed to supply the toner from the toner storing container 68 to the conveyance path forming member 70 by rotating the toner supply unit 71 such that the conveyance path forming member 70 is replenished with the toner, and adjustment is performed such that an image density is not lowered. As illustrated in FIG. 5, the toner replenishment is performed in a case where, for example, the number of sheets reaches 30 sheets or 40 sheets. The 30 sheets indicate a case of continuous printing, and the 40 sheets indicate a case of non-continuous printing. In a case of the double-sided printing, printing page is used instead of the number of sheets to be printed. The toner replenishment may be performed for each color of yellow, magenta, cyan, or black, and the number of sheets to be printed, which is used as a threshold in color printing and monochrome printing, may be changed. In addition, the number of printed pixels may be counted instead of the number of sheets to be printed. In addition, in addition to the number of sheets to be printed, detection, which is performed by an empty detection sensor, of a fact that the conveyance path forming member 70 is not replenished with the toner, detection, which is performed by, for example, a magnetic sensor, of a fact that the amount of toner with respect to the carrier in the development device main body 60 is insufficient, and detection of a fact that a patch (which indicates an image for measurement) is formed on the photoreceptor 26 and a density of the patch formed on the photoreceptor 26, a patch transferred to the intermediate transfer belt 28, or a patch transferred to the recording medium is insufficient, may be used as a condition.

In addition, the position shift correction, the grayscale correction, or the like is performed in such a way that a test image is formed on the recording medium and a shift of the test image is read by the image sensor or the image reading unit 16. For example, the position shift correction is performed in a case where 300 sheets are printed, and the grayscale correction is performed in a case where 400 sheets are printed.

Time from start to end of performance differs according to the type of the image quality adjustment. In FIG. 5, the respective time appear as a reference. For example, it takes 10 seconds for the toner replenishment, it takes 30 seconds for the position shift correction, and it takes 50 seconds for the grayscale correction. Meanwhile, data of a list in FIG. 5 is stored in, for example, the storage device 82.

In a case where the necessity of the image quality adjustment is detected in step S10, the printing unit controlling unit 84 notifies the necessity of the image quality adjustment to the CPU 78 in step S12. In a case where the CPU 78 receives the necessity of the image quality adjustment, the CPU 78 detects whether or not the user starts a time-consuming operation in subsequent step S14. Whether or not the user starts the time-consuming operation indicates whether or not of a case where a state in which an operation, in which the number of operations is larger than a predetermined number, is started.

FIG. 6 illustrates a list of the number of operations and estimated time with respect to an operation of the user.

For example, an operation ID (a number specifying an operation) 1 indicates a facsimile address input operation. As illustrated in FIG. 6, in a case where an operation of inputting an address number into an address input unit 102 starts in a facsimile basic screen 100 and the address number includes 10 digits, the number of operations performed by the user is 10. Further, since the method, in which the facsimile controlling unit 92 reads the image using the image reading unit 16 after the communication with the address, to which the image is sent, is established, as described above, the number of operations is added, and thus a total number of operations are 11. For the operation ID 1, it takes, for example, 60 seconds as time until the operation ends.

Figure 7:
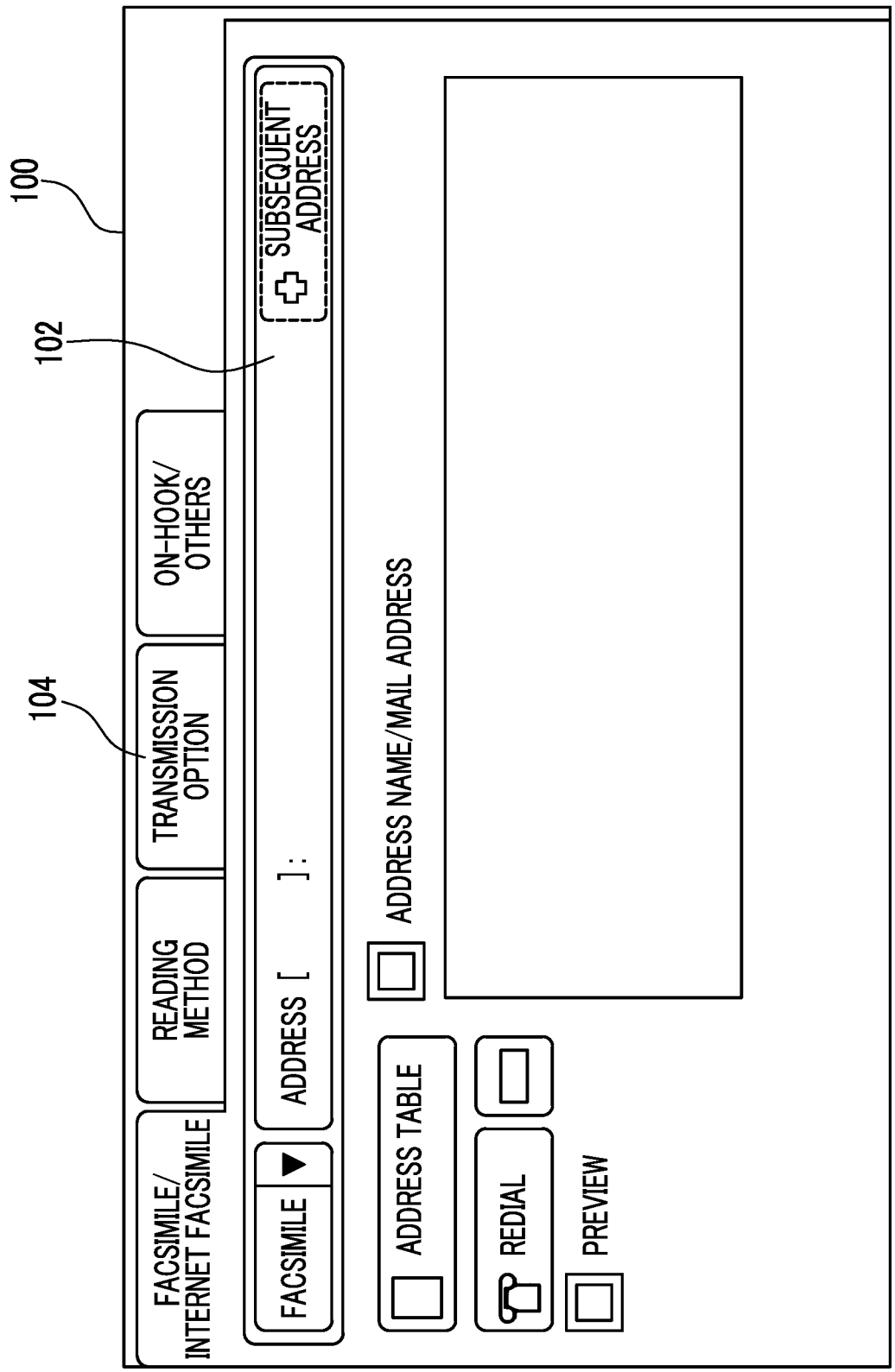
FIG. 7 is a screen diagram illustrating a facsimile basic screen in the image forming apparatus according to the exemplary embodiment of the present invention.

An operation ID 2 indicates a detailed setting operation for the facsimile. As illustrated in FIG. 7, the facsimile basic screen 100 is provided with tabs (screen switch controlling unit) 104 for moving to screens of a reading method, a transmission option, and on-hook/others. For example, in a case where the reading method is selected, the screen is switched to a screen for setting double-sided document sending, a reading size, a reading magnification, and the like. In addition, in a case where the transmission option is selected, the screen is switched to a screen for setting a communication mode, the number of transmission destination units, and the like. In addition, in a case where the on-hook/others is selected, the screen is switched to a screen for setting polling or the like. The user performs at least three times of operations including an operation of opening the tab, an operation of performing setting in a switched tab, or an operation of returning to an original screen. For the operation ID 2, it takes, for example, 15 seconds, as the time until the operation ends.

Figure 8:
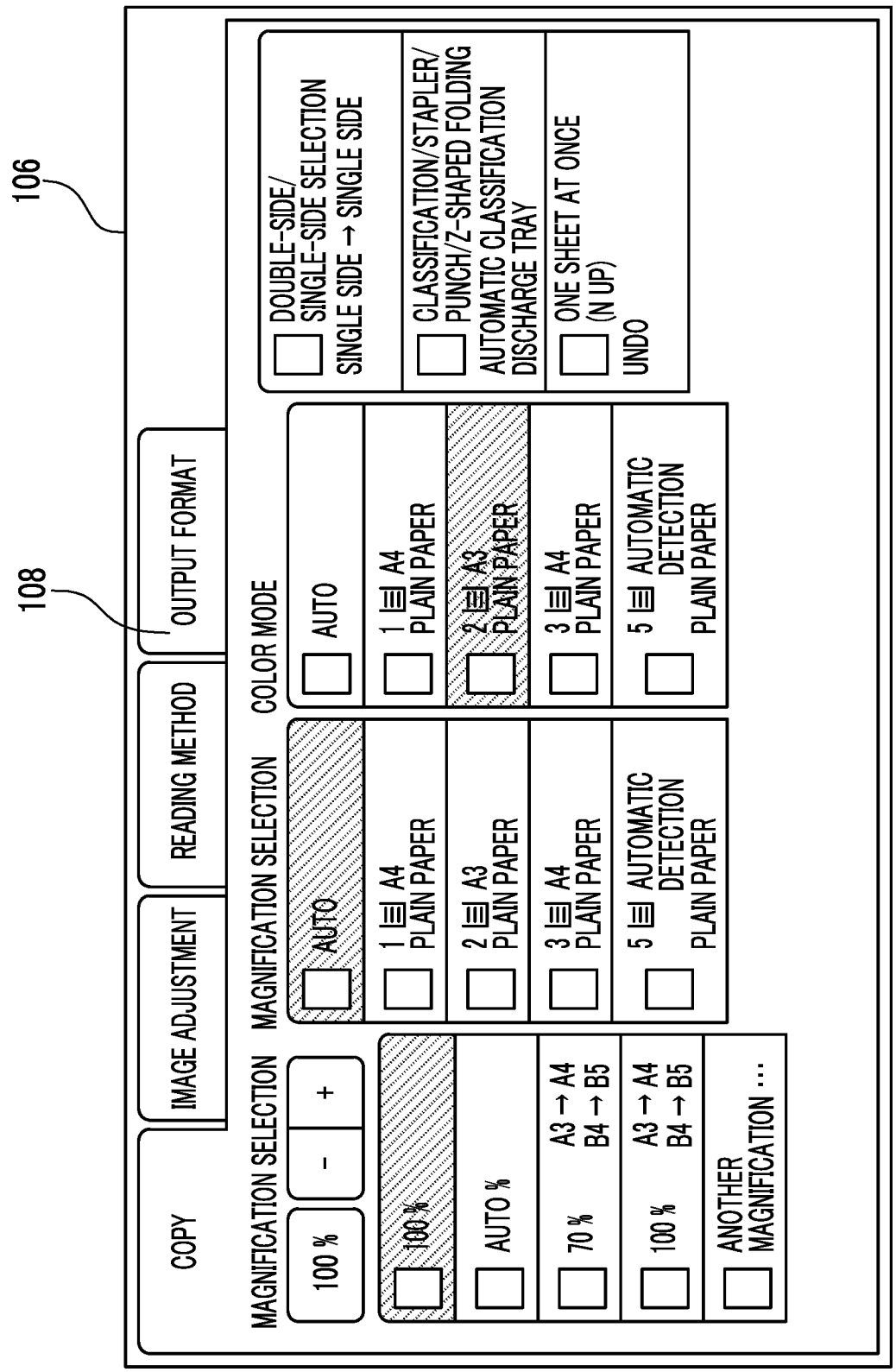
FIG. 8 is a screen diagram illustrating a copy basic screen in the image forming apparatus according to the exemplary embodiment of the present invention.

An operation ID 3 indicates a detailed setting operation for a copy. As illustrated in FIG. 8, a copy basic screen 106 is provided with tabs 108 for transition to screens of the image quality adjustment (the image quality is manually adjusted), the reading method, and an output format. For example, in a case where the image quality adjustment is selected, the screen is switched to a screen for manually adjusting a density, a color balance, and the like. In addition, in a case where the reading method is selected, the screen is switched to a screen for performing double-side/single-side selection and selecting a frame eraser, or the like. In addition, in a case where the output format is selected, the screen is switched to a screen for performing the double-side/single-side selection, and selecting one sheet at once (a plurality of document pages are printed on one sheet of recording medium), and the like. Similarly to the operation ID 2, the user performs at least three times of operations including the operation of opening the tab, the operation of performing setting in the switched tab, or the operation of returning to the original screen. For the operation ID 3, it takes, for example, 15 seconds, as the time until the operation ends.

Figure 9:
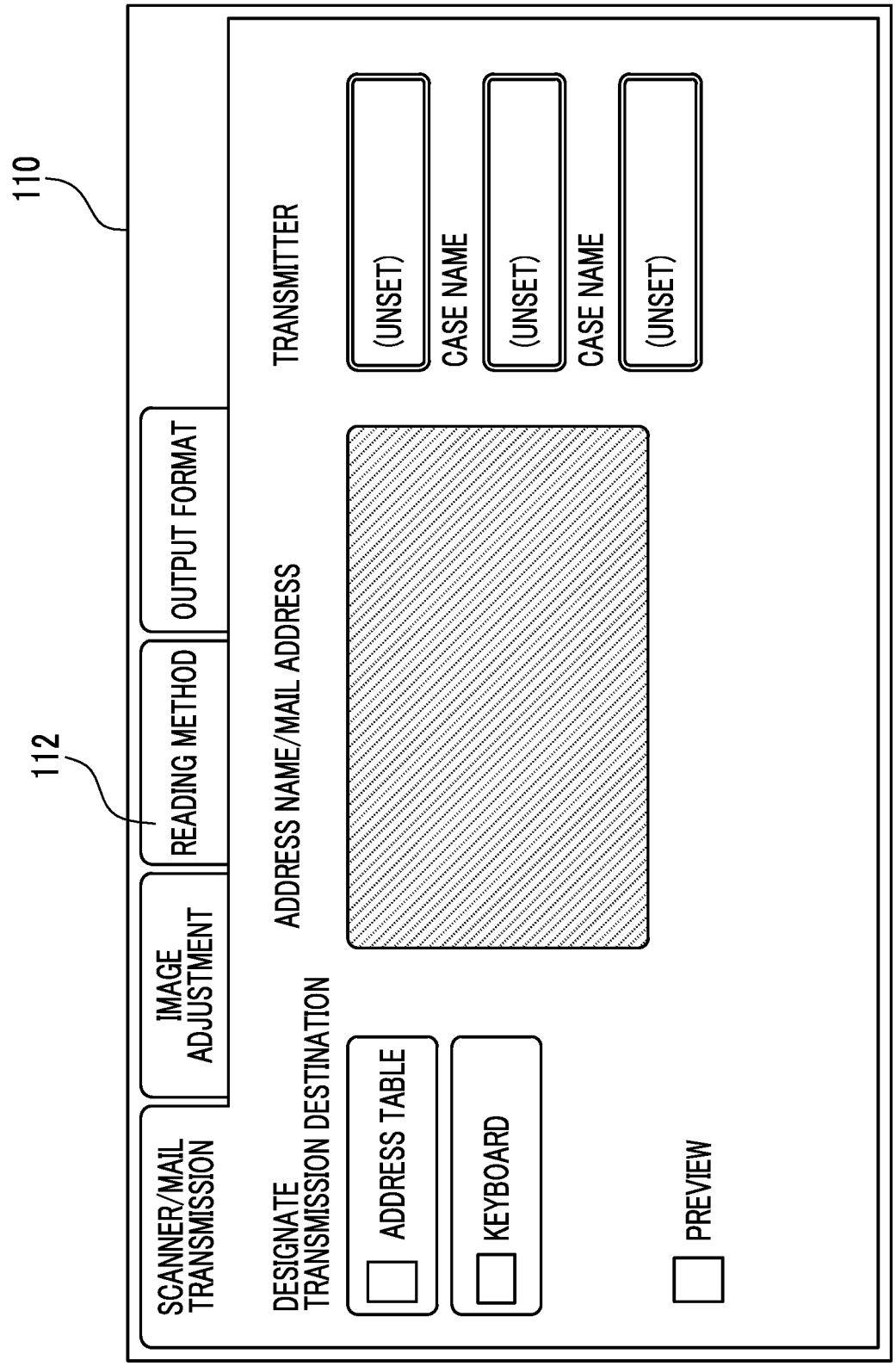
FIG. 9 is a screen diagram illustrating a reading basic screen in the image forming apparatus according to the exemplary embodiment of the present invention.

An operation ID 4 indicates a detailed setting operation for the reading. As illustrated in FIG. 9, a reading basic screen 110 is provided with tabs 112 for the image quality adjustment, the reading method, and the output format. All the tabs are similar to the operation ID 2 or 3, and the user performs at least three times of operations including the operation of opening the tab, the operation of performing setting in the switched tab, or the operation of returning to the original screen. For the operation ID 4, it takes, for example, 15 seconds, as the time until the operation ends. Meanwhile, the data of the list of FIG. 6 is stored in, for example, the storage device 82. In addition, it is possible to edit an operation item of the list through the operation of the user. In addition, the operation time may be derived through, for example, average time or standard deviation by accumulating operation time with respect to past operation and performing a statistical process.

Meanwhile, in addition to an input of the address of the facsimile corresponding to the operation ID 1, there is a case where the read document is sent through a mail. In this case, a mail address is input as the address input operation.

In step S12, it is determined whether or not to perform an image quality adjustment operation based on the operation time with respect to the above-described operation. That is, for example, in a case where the input of the address of the facsimile corresponding to the operation ID 1 starts, required time of all adjustment items illustrated in FIG. 5 are satisfied, and thus it is possible to perform adjustment of the all the adjustment items without waiting for the user. In the operation IDs 2 to 4, it is possible to perform the toner replenishment without waiting for the user.

In a case where it is detected that the user starts the time-consuming operation in step S12, the CPU 78 instructs the printing unit controlling unit 84 about a matter of the image quality adjustment in step S16. In subsequent step S18, the printing unit controlling unit 84 performs the image quality adjustment.

Meanwhile, although the CPU 78 may instruct to perform the image quality adjustment only in a case where process time of the user or the image forming apparatus is longer than required time of the image quality in step S16, the CPU 78 may instruct to perform the image quality adjustment in a case where time until the image quality adjustment ends is included in predetermined time.

Figure 10:
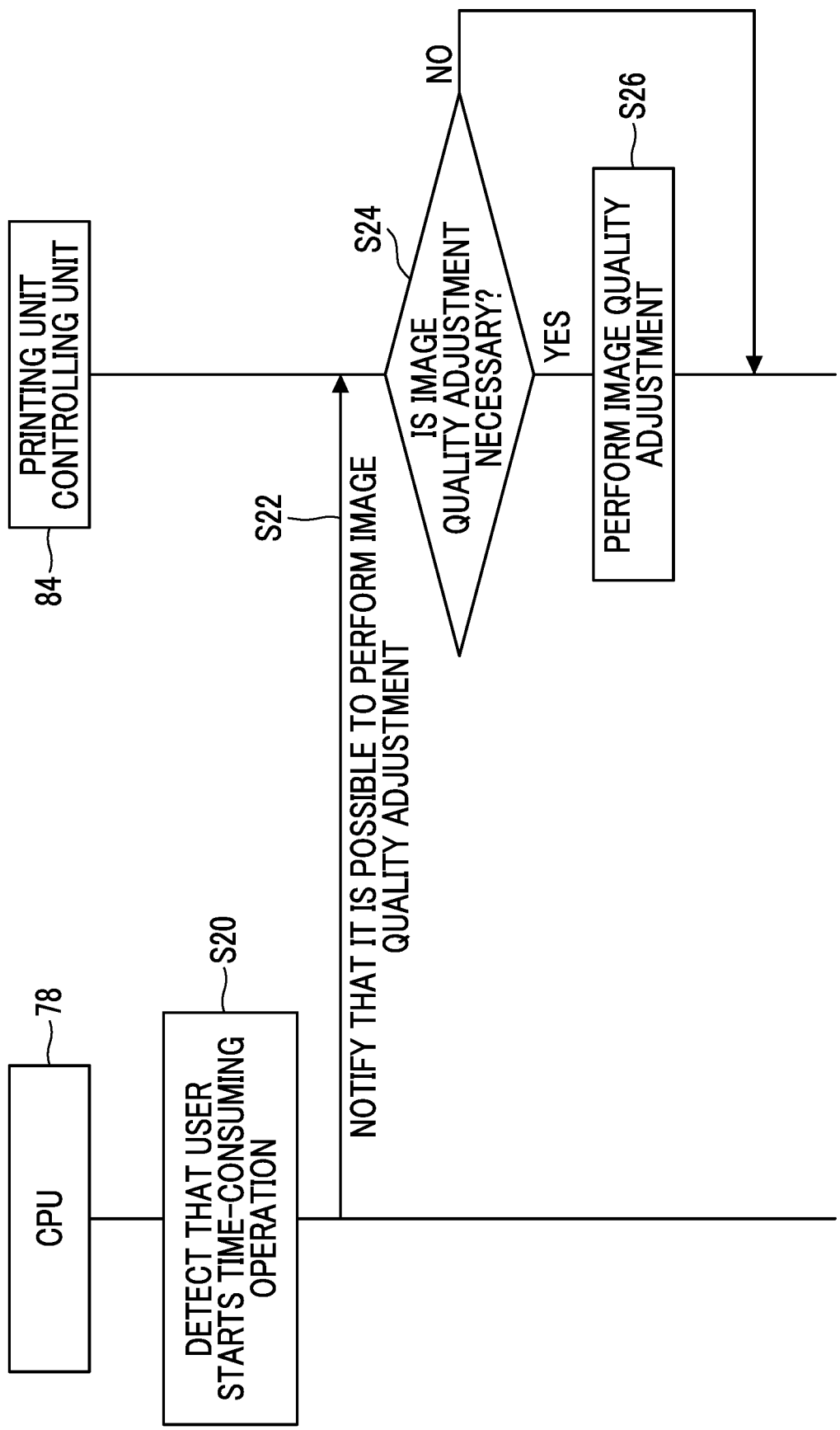
FIG. 10 is a sequence diagram illustrating a second example of a flow of a process performed between the CPU and the image forming unit controlling unit in the image forming apparatus according to the exemplary embodiment of the present invention.

FIG. 10 is a sequence diagram illustrating a second example of a sequence performed by the CPU 78 and the print control unit 84.

First, in step S20, the CPU 78 detects that the user starts the time-consuming operation. In subsequent step S22, the CPU 78 notifies a fact that it is possible to perform the image quality adjustment to the printing unit controlling unit 84. In subsequent step S24, the printing unit controlling unit 84 determines whether or not the image quality adjustment is necessary. In a case where it is determined that the image quality adjustment is not necessary in step S24, the process ends. In a case where it is determined that the image quality adjustment is necessary, the process proceeds to step S26 and the image quality adjustment is performed.

Meanwhile, the time-consuming operation of the user and the necessity of the image quality adjustment are the same as in the above-described first example.

Figure 11:
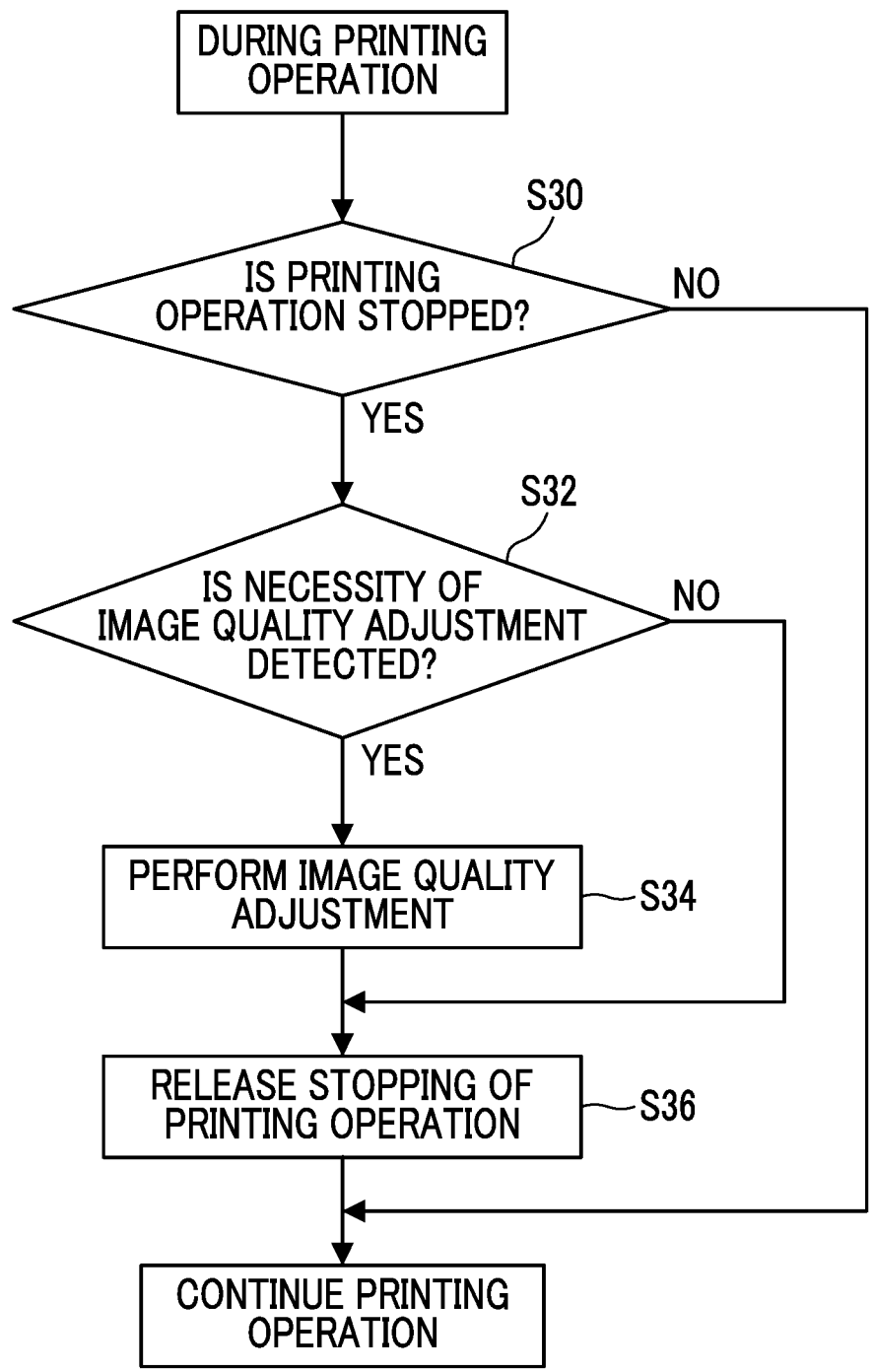
FIG. 11 is a flowchart illustrating a third example of a flow of a process performed between the CPU and the image forming unit controlling unit in the image forming apparatus according to the exemplary embodiment of the present invention.

FIG. 11 is a sequence diagram illustrating a third example of a sequence performed by the CPU 78 and the print control unit 84. In the third example, the image quality adjustment is performed in a case where a printing operation is stopped while the printing operation is performed.

Meanwhile, the case where the printing operation is stopped while the printing operation is performed indicates a case where the image forming apparatus 10 detects a state in which printing should be stopped excluding a case where a stop instruction is received from the user.

First, in step S30, it is determined whether or not the printing operation is stopped. There is a case where the recording medium to be printed does not exist as one of a case where the printing operation is stopped. That is, as described above, there is a case where the recording medium supply unit 18 is provided with a recording medium existence/non-existence sensor, which detects existence/non-existence of the recording medium, and a fact that the recording medium does not exist is detected by the recording medium existence/non-existence sensor. In a case where the recording medium does not exist in the recording medium supply unit 18, four times of operations are necessary, that is, the user, first, opens the recording medium supply unit 18, subsequently, feeds the recording medium into the recording medium supply unit 18, subsequently, closes the recording medium supply unit 18, and presses a start button for restart. The operation requires normally 60 seconds or more, and thus the user is not kept waiting even in a case where any of the image quality adjustments illustrated in FIG. 5 is performed.

In step S30, the printing operation is continued in a case where it is determined that the printing operation is not stopped, and the process proceeds to step S32 in a case where it is determined that the printing operation is stopped.

In step S32, it is determined whether or not the necessity of the image quality adjustment is detected. The necessity of the image quality adjustment is the same as in the above-described first and second examples. In step S32, in a case where it is determined that the necessity of the image quality adjustment exists, the process proceeds to step S34, and the image quality adjustment is performed. In a case where the recording medium is fed into the recording medium supply unit 18 in subsequent step S36, stopping of the printing operation is released, and the printing operation is performed. In a case where it is determined that the necessity of the image quality adjustment does not exist step S34, the process proceeds to step S36, and the stopping of the printing operation is released.

Meanwhile, the case where the printing operation is stopped in step S30 is not limited to only a case where the recording medium laminated in the recording medium supply unit 18 is exhausted during the printing. For example, in a case where, although a size of the recording medium laminated in the recording medium supply unit 18 matches a document size at first of the printing, a document having a different document size is included, and thus the printing is stopped due to size mismatch. In this case, it is necessary for the user to newly feed a recording medium which matches the document size into the recording medium supply unit 18, and at least three times of operations are performed. In addition, in a case where the recording medium discharged to the recording medium discharging unit 46 reaches the upper limit, the case is detected by the above-described discharged recording medium sensor, and the printing operation is stopped. In this case, two times of operations of extracting the recording medium of the recording medium discharging unit 46 and, subsequently, instructing restart are necessary.

However, a case where the recording medium is jammed in the recording medium conveyance path 22 and the printing operation is stopped is not included. Since it is necessary to drive the image forming unit in order to perform the image quality adjustment, the above case is excluded.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
  a printing unit that prints an image on a recording medium; and
  a controller configured to perform an image quality adjustment on the printing unit in a case of an operation in which the number of user operations is greater than a predetermined number is started,
  wherein the controller performs the image quality adjustment in a case where a user starts an input of an address of a transmission destination of data from the image forming apparatus in an operation device which receives an input operation with respect to the image forming apparatus.

2. The image forming apparatus according to claim 1,
  wherein the controller performs the image quality adjustment in a case where the user performs an operation of causing a basic screen of the operation device to transition to a detail screen for performing setting in detail with respect to one basic function which is set in the basic screen.

3. The image forming apparatus according to claim 2, wherein the controller is further configured to:
  detect a fact that it is necessary to perform the image quality adjustment,
  wherein the controller performs the image quality adjustment in a case where the controller detects that it is necessary to perform the image quality adjustment.

4. The image forming apparatus according to claim 1,
  wherein the controller performs the image quality adjustment in a case where the user starts the input of the address from an address input screen.

5. The image forming apparatus according to claim 1,
  wherein the controller performs the image quality adjustment in a case where a printing operation is stopped while the printing unit performs the printing operation.

6. The image forming apparatus according to claim 5,
  wherein the controller performs the image quality adjustment in a case where the recording medium to be printed by the printing unit does not exist.

7. The image forming apparatus according to claim 6,
  wherein the controller performs the image quality adjustment in a case where the recording medium does not exist in a recording medium conveyance path from a recording medium supply unit, to which the recording medium is supplied, to a recording medium discharging unit to which the recording medium is discharged.

8. The image forming apparatus according to claim 6,
  wherein the controller does not perform the image quality adjustment in a case where the recording medium exists in a recording medium conveyance path from a recording medium supply unit, to which the recording medium is supplied, to a recording medium discharging unit to which the recording medium is discharged.

9. The image forming apparatus according to claim 5,
  wherein the controller performs the image quality adjustment in a case where the number of discharging sheets of the recording medium, which is printed by the printing unit, reaches a predetermined number of sheets.

10. The image forming apparatus according to claim 9,
  wherein the controller performs the image quality adjustment in a case where the recording medium does not exist in a recording medium conveyance path from a recording medium supply unit, to which the recording medium is supplied, to a recording medium discharging unit to which the recording medium is discharged.

11. The image forming apparatus according to claim 9,
  wherein the controller does not perform the image quality adjustment in a case where the recording medium exists in a recording medium conveyance path from a recording medium supply unit, to which the recording medium is supplied, to a recording medium discharging unit to which the recording medium is discharged.

12. The image forming apparatus according to claim 5,
  wherein the controller performs the image quality adjustment in a case where the recording medium does not exist in a recording medium conveyance path from a recording medium supply unit, to which the recording medium is supplied, to a recording medium discharging unit to which the recording medium is discharged.

13. The image forming apparatus according to claim 5,
  wherein the controller does not perform the image quality adjustment in a case where the recording medium exists in a recording medium conveyance path from a recording medium supply unit, to which the recording medium is supplied, to a recording medium discharging unit to which the recording medium is discharged.

14. The image forming apparatus according to claim 1, wherein the controller is further configured to:
  detect a fact that it is necessary to perform the image quality adjustment,
  wherein the controller performs the image quality adjustment in a case where the controller detects that it is necessary to perform the image quality adjustment.

15. The image forming apparatus according to claim 14, wherein the controller is further configured to:
  detect the state in which the operation, in which the number of operations performed by the user is larger than the predetermined number, is started,
  wherein the controller performs the image quality adjustment in a case where the controller detects the state in which the operation is started, which causes the number of operations performed by the user to become larger than the predetermined number, and the controller detects that it is necessary to perform the image quality adjustment.

16. The image forming apparatus according to claim 1, wherein the controller is further configured to:
- detect a fact that it is necessary to perform the image quality adjustment,
- wherein the controller does not perform the image quality adjustment in a case where the controller does not detect that it is necessary to perform the image quality adjustment.

17. The image forming apparatus according to claim 16, wherein the controller is further configured to:
- detect the state in which the operation, in which the number of operations performed by the user is larger than the predetermined number, is started,
- wherein the controller does not perform the image quality adjustment in a case where the controller does not detect that the state in which the operation is started, which causes the number of operations performed by the user to become larger than the predetermined number, or the controller does not detect that it is necessary to perform the image quality adjustment.

* * * * *